United States Patent [19]

Jackson

[11] Patent Number: 4,824,715

[45] Date of Patent: Apr. 25, 1989

[54] ENGRAVING PROCESS AND PRODUCT THEREOF

[75] Inventor: Gregory D. Jackson, Sturgis, Mich.

[73] Assignee: Electro-Voice, Incorporated, Buchanan, Mich.

[21] Appl. No.: 156,706

[22] Filed: Feb. 17, 1988

Related U.S. Application Data

[62] Division of Ser. No. 883,125, Jul. 8, 1986, Pat. No. 4,745,020.

[51] Int. Cl.$^4$ .......................... B32B 3/10; B05D 3/02; B05D 3/12
[52] U.S. Cl. .................................. 428/172; 427/276; 427/277; 428/174; 428/187; 428/413; 428/419; 428/195
[58] Field of Search ................ 427/276, 277; 428/419, 428/195, 187, 172, 174, 413

[56] References Cited

U.S. PATENT DOCUMENTS

| | | | |
|---|---|---|---|
| 3,930,924 | 1/1976 | Oka et al. | 427/276 X |
| 4,044,175 | 8/1977 | Coxon et al. | 427/407.1 |
| 4,528,909 | 7/1985 | Rigg et al. | 427/386 |

FOREIGN PATENT DOCUMENTS 0129077  10/1979  Japan ............................... 428/419

*Primary Examiner*—Evan Lawrence
*Attorney, Agent, or Firm*—Burmeister, York, Palmatier, Hamby & Jones

[57] ABSTRACT

An engraved plastic article is prepared by applying a coat of epoxy resin paint to a polyether sulfone resin article, curing the coated article at an elevated temperature, and engraving indicia on a surface of the article. During engraving the paint coating does not loosen, chip or otherwise dislodge.

12 Claims, No Drawings

ENGRAVING PROCESS AND PRODUCT THEREOF

This is a division of application Ser. No. 06/883,125, filed July 8, 1986, now U.S. Pat. No. 4,745,020.

This invention relates to a process for preparing plastic articles bearing engraved indicia thereon. More particularly, it relates to a process for preparing epoxy paint-coated polyether sulfone resin articles bearing fine and detailed engraved indicia thereon.

It is well known that display signs, nameplates and other products having a plastic substrate and an acrylic sheet laminated thereon, may be engraved for various applications, so that the substrate shows through cutaway portions of the acrylic lamination to show indicia or the like. However, the process of engraving acrylic extruded laminate plastic articles is not suitable when legible indicia having an engraved depth and height of significantly less than 0.035 inches and 0.08 inches, respectively, are desired. Moreover, the process of lamination often requires a number of extruding steps, and is thus, relatively expensive and complex. It would be desirable to provide a less costly and complex manufacturing process for preparing engraved plastic products. The coating of a plastic substrate with a paint, prior to engraving, has been a simple and relatively inexpensive alternative when fine and detailed engraving is not required and when irregularly shaped articles are not used.

Plastic articles having a coating of paint already have widespread applications. For example, microphone housings are often formed of a plastic material which has been coated with paint. It is well known that particular indicia may be engraved on the surface of such painted plastic articles to remove the paint coating in order to uncover the substrate and thereby identify, inter alia, such items as the source of manufacture, the model number, and other features of products within such housings. However, in many instances, fine and detailed engraving of paint-coated plastic has been accompanied by the loosening or chipping of the coated paint. This is undesirable since it adversely affects the appearance of the coated product and in addition, prevents manufacturers from clearly identifying product features by engraving. This chipping or loosening problem, has been avoided to date only by the implementation of expensive technology. However, even the utilization of such expensive technology has become more difficult and is undesirable when platic parts having curved surfaces or irregular shapes or sizes are used.

It is an object of the present invention to provide a new and relatively inexpensive process for preparing a paint-coated plastic article permitting fine and detailed engraving thereon.

It is another object of this invention to provide a process for preparing an engraved paint-coated plastic on which the paint does not dislodge after engraving.

It is a further object of this invention to use, in such a process, a plastic substrate which can withstand relatively high temperatures permitting attaining a good paint-to-substrate bond.

It is another object of the present invention to provide a process usable on plastic substrates of various shapes and sizes, and in particular substrates having curved surfaces.

It is yet a further object of the present invention to provide an engraved article which is prepared by the abovedescribed process.

In accordance with the present invention, an article made from a polyether sulfone resin is first coated with an epoxy paint material and is then cured at an elevated temperature to form a durable bond between the epoxy paint and the polyether sulfone substrate. Indicia are then engraved on the surface of the article, e.g., by cutting both through the paint coating and into the polyether sulfone substrate. Engraving may be achieved by conventional rotary engraving tools.

It is believed that molecular bonding between the substrate and the paint occurs during the curing step. It is also believed that the problem of paint chipping is avoided as a result of this molecular bonding. In contrast to other plastics, polyether sulfone resins are advantageously capable of withstanding the elevated temperatures (i.e. temperatures approaching the vicat softening point of the resin) which effectuate the desirable molecular bonding.

While other polyether sulfone resins may be suitable for the purposes of this invention, it is preferred that a polyether sulfone resin substrate be used which is represented by the formula:

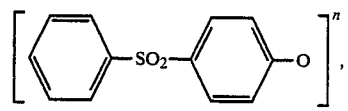

wherein n represents the number of repeat units in the linear polymer. This type of polyether sulfone resin substrate is particularly desirable since it possesses improved chemical resistance and impact properties and is also capable of withstanding relatively high temperatures which produce enhanced bonding of the epoxy paint.

Paint containing an epoxy-resin component and at least one color pigment is appled to the polyether sulfone substrate. While spray application of the epoxy paint is preferred, in order to provide a thin coat of paint, other forms of application may be suitable. The paint may also include a reducer component which contains volatile alcohol and ketone compounds. The volatile reducer compounds are effective in thinning the epoxy paint to facilitate forming a thin coat.

The coated polyether sulfone substrate is then cured in a standard convection oven at a temperature of from about 380° F. to 450° F. for a period of 20 to 30 minutes. When the preferred polyether sulfone resin of the above-identified formula is used, the curing temperature should be from about 410° F. to about 425° F., and most preferably should be 425° F. The cured epoxy paint should have a hardness of from about 3H to about 6H, and preferably about 6H. The hardness may be tested in accordance with the pencil hardness test, ASTM test designation D-3363-74. Fine and detailed indicia including, inter alia, word, logos, and numbers, may be engraved in this way on the surface of the coated substrate.

The following example is presented to more fully illustrate the present invention.

EXAMPLE

An irregularly shaped microphone housing part having curved surfaces was prepared from a polyether sulfone resin of the formula

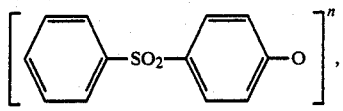

which is available from Imperial Chemical Industries, Materials Business Group, Wilmington, Del. 19897, as VICTREX PES 4800 G. A black epoxy-resin paint, available from Egyptian Lacquer Manufacturing Company, Inc., 555 Sagamore Parkway South, P.O. Box 4449, Lafayette, Ind. 47903, and having product designation ED-L 2245, was sprayed on the microphone housing part to form a thin coat thereon. This paint contains, inter alia, a BIS phenol A type epoxy resin, a butylated urea formaldehyde resin, and a carbon black pigment. The epoxy-resin paint was mixed with a reducer component (which is also available from the Egyptian Lacquer Manufacturing Company, Inc., as RD-L 107), prior to its deposition on the housing part. The reducer component contains various volatile materials including alcohols and ketones. The coated housing part was then cured in a convection oven at a temperature of 425° F. for a period of 20 to 30 minutes. The cured epoxy paint had a hardness of 6H. A standard engraving tool was then used to engrave fine and detailed indicia, including words, logos and numbers, on a curved surface of the coated housing part. The indicia had a depth of from about 0.0005 inches to about 0.0012 inches, a width of 0.015 inches to 0.025 inches, and a character height of from about 0.037 inches to about 2.96 inches. Upon visual inspection of the engraved housing part, no chipping or loosening of the paint coating occurred. The engraved indicia had sharp edges supplying excellent definition for the indicia.

The foregoing example illustrates an embodiment of the present invention. Many modifications thereof may be made without departing from the spirit and the scope of the invention, which is defined by the following claims.

What is claimed is:

1. A process for preparing an article bearing engraved indicia thereon consisting essentially of:
    coating the surface of a polyether sulfone resin article with an epoxy resin paint material;
    curing the coated article at an elevated temperature to form a bond between the paint material and the article;
    engraving indicia on said surface of the cured article.
2. A process as described in claim 1 wherein the coated polyether sulfone resin article is cured at a temperature of from about 380° to about 450° F.
3. The process as described in claim 1 wherein the article is formed of a polyether sulfone resin linear polymer represented by the formula

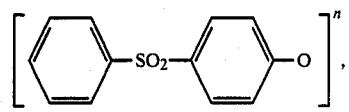

in which n represents the number of repeat units in the polymer.
4. The process as described inclaim 3 wherein the coated polyether sulfone resin article is cured at a temperature of from about 410° F. to about 425° F.
5. The process as described in claim 4 wherein the engraving is performed by the use of a rotary engraving implement.
6. The process as described in claim 5 wherein said engraving step comprises cutting through the paint material and into the article.
7. A process as described in claim 1 wherein indicia having a depth of from about 0.0005 inches to about 0.0012 inches are engraved on the surface of the cured article.
8. A process as described in claim 1 wherein indicia having a width of from about 0.015 inches to about 0.025 inches are engraved on the surface of the cured article.
9. A process as described in claim 1 wherein indicia having a height of from about 0.37 inches to about 2.96 inches are engraved on the surface of the cured article.
10. A process as described in claim 1 wherein the surface of the cured article is curved.
11. A process as described in claim 1 wherein the hardness of the epoxy resin paint material, after curing, is from about 3H to 6H.
12. An article made by the process of claim 1.

* * * * *